United States Patent
Hutton et al.

(10) Patent No.: US 11,256,656 B2
(45) Date of Patent: Feb. 22, 2022

(54) HYBRID PROGRAMMABLE MANY-CORE DEVICE WITH ON-CHIP INTERCONNECT

(71) Applicant: Altera Corporation, San Jose, CA (US)

(72) Inventors: Michael D. Hutton, Palo Alto, CA (US); Anargyros Krikelis, San Jose, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 16/859,728

(22) Filed: Apr. 27, 2020

(65) Prior Publication Data

US 2020/0257651 A1 Aug. 13, 2020

Related U.S. Application Data

(60) Continuation of application No. 16/186,248, filed on Nov. 9, 2018, now Pat. No. 10,635,631, which is a
(Continued)

(51) Int. Cl.
*G06F 15/76* (2006.01)
*G06F 15/78* (2006.01)

(52) U.S. Cl.
CPC .......... *G06F 15/76* (2013.01); *G06F 15/7867* (2013.01); *Y02D 10/00* (2018.01)

(58) Field of Classification Search
CPC ...... G06F 15/76; G06F 15/7867; Y02D 10/00
See application file for complete search history.

(56) References Cited

U.S. PATENT DOCUMENTS 6,803,786 B1 10/2004 Bilski et al.
7,157,934 B2 1/2007 Teifel et al.
(Continued)

FOREIGN PATENT DOCUMENTS

| CN | 1591377 A | 3/2005 |
|---|---|---|
| CN | 101373967 A | 2/2009 |
| CN | 10190321 A | 12/2010 |

OTHER PUBLICATIONS

Hauser et al., "Garp: A MIPS Processor with a Reconfigurable Coprocessor", University of California, Berkeley, pp. 24-33 (Apr. 1997).
(Continued)

*Primary Examiner* — Cheng Yuan Tseng
(74) *Attorney, Agent, or Firm* — Fletcher Yoder, P.C.

(57) ABSTRACT

The present invention provides a hybrid programmable logic device which includes a programmable field programmable gate array logic fabric and a many-core distributed processing subsystem. The device integrates both a fabric of programmable logic elements and processors in the same device, i.e., the same chip. The programmable logic elements may be sized and arranged such that place and route tools can address the processors and logic elements as a homogenous routing fabric. The programmable logic elements may provide hardware acceleration functions to the processors that can be defined after the device is fabricated. The device may include scheduling circuitry that can schedule the transmission of data on horizontal and vertical connectors in the logic fabric to transmit data between the programmable logic elements and processor in an asynchronous manner.

20 Claims, 7 Drawing Sheets

Related U.S. Application Data continuation of application No. 15/823,353, filed on Nov. 27, 2017, now Pat. No. 10,127,190, which is a division of application No. 15/288,569, filed on Oct. 7, 2016, now Pat. No. 9,830,300, which is a continuation of application No. 13/804,419, filed on Mar. 14, 2013, now Pat. No. 9,471,537.

(56) References Cited

U.S. PATENT DOCUMENTS

| | | | |
|---|---|---|---|
| 7,200,735 B2 | 4/2007 | Wang et al. | |
| 7,461,236 B1 | 12/2008 | Wentzlaff | |
| 7,746,862 B1 | 6/2010 | Zuk et al. | |
| 8,281,265 B2 * | 10/2012 | Vorbach | G06F 15/7867 716/100 |
| 8,667,192 B2 * | 3/2014 | Allaire | G06F 15/7867 710/104 |
| 8,769,477 B1 * | 7/2014 | Gathoo | G06F 30/34 716/139 |
| 2002/0064154 A1 | 5/2002 | Sharma et al. | |
| 2002/0097679 A1 | 7/2002 | Berenbaum | |
| 2003/0062922 A1 | 4/2003 | Douglass et al. | |
| 2003/0128050 A1 | 7/2003 | Schultz | |
| 2003/0172249 A1 | 9/2003 | Ganapathy et al. | |
| 2004/0049613 A1 | 3/2004 | Kim et al. | |
| 2004/0158573 A1 | 8/2004 | Bradley et al. | |
| 2005/0249185 A1 | 11/2005 | Poor et al. | |
| 2006/0179156 A1 | 8/2006 | Eatherton et al. | |
| 2007/0053356 A1 | 3/2007 | Konda | |
| 2011/0238948 A1 * | 9/2011 | Vorbach | G06F 9/30047 712/15 |

OTHER PUBLICATIONS

Hecht et al., "Dynamic Reconfiguration with Hardwired Networks-on-Chip on Future FPGAs", International Conference on Field Programmable Logic and Applications, Aug. 24-26, 2005, pp. 527-530.

Kubisch et al., "Mapping a Pipelined Data Path onto a Network-on-Chip," Industrial Embedded Systems, SIES '07, International Symposium On IEEE, PI, Jul. 1, 2007, pp. 178-185.

European Patent Office Search Report for Application No. 14158110.8, dated Jun. 17, 2015; 6 Pages.

Chinese Office Action for CN Application No. 201410092909.4 dated May 20, 2016; 12 Pages.

AXI, AXI Reference Guide, 2011, Xilinx, pp. 1-82. (Year: 2011).

* cited by examiner

HYBRID PROGRAMMABLE MANY-CORE DEVICE WITH ON-CHIP INTERCONNECT

CROSS-REFERENCE TO RELATED APPLICATIONS

This application is a continuation of application Ser. No. 16/186,248, filed Nov. 9, 2018, entitled "Hybrid Programmable Many-Core Device with On-Chip Interconnect," which is a continuation of application Ser. No. 15/823,353, filed Nov. 27, 2017, which issued as U.S. Pat. No. 10,127,190 on Nov. 13, 2018, entitled "Hybrid Programmable Many-Core Device with On-Chip Interconnect," which is a division of application Ser. No. 15/288,569, filed Oct. 7, 2016, which issued as U.S. Pat. No. 9,830,300 on Nov. 28, 2017, entitled "Hybrid Programmable Many-Core Device with On-Chip Interconnect," which is a continuation of application Ser. No. 13/804,419, filed Mar. 14, 2013, which issued as U.S. Pat. No. 9,471,537 on Oct. 18, 2016, entitled "Hybrid Programmable Many-Core Device with On-Chip Interconnect," the disclosures of each of which are hereby incorporated by reference herein in their entirety.

BACKGROUND OF THE INVENTION

The present invention relates to a hybrid programmable logic device containing many programmable processors, dedicated function blocks, and programmable FPGA fabric. The present invention is particularly useful for network and packet processing, although it may be used in other applications.

Many-core (i.e., multiple core) devices have provided a way to increase performance of a device without incurring the cost of increasing clock speeds. Many-core devices may include dedicated ASIC blocks for hardware specific functions, such as error control coding or cryptography. These blocks are often referred to as hardware accelerators.

SUMMARY OF THE INVENTION

The present invention provides a hybrid programmable logic device which includes a programmable field programmable gate array logic fabric (e.g., programmable logic elements) and a many-core distributed processing subsystem (e.g., many-core processors). It is noted that the term "hybrid" refers to a device which integrates both a fabric of programmable logic elements and processors in the same device, i.e., the same chip. In the provided architecture, the programmable logic elements may provide hardware acceleration functions that are "late binding," meaning that the specific functionality and logic architecture used to form a hardware acceleration function can be defined after the device is fabricated. For example, the programmable logic elements may be partitioned or grouped into hardware accelerators via software that programs the hybrid programmable logic device at runtime. It is also noted that the term "device" refers to any embodiment or combination or embodiments of a hybrid programmable logic device described herein.

In certain embodiments, the processors may be integrated into the programmable logic fabric such that one or more physical dimensions of the processors, such as width, length, or height, are a multiple of the same physical dimension (i.e., the corresponding length, width, or height) or the programmable logic elements. This allows for efficient assembly of devices having different dimensions, with differing ratios of processors to programmable logic elements or other logic blocks. In certain embodiments, the processors may be "hardened," meaning that they consist of fixed logic elements rather than programmable logic elements. This feature provides the integration of powerful many-core processors into a programmable logic fabric. In certain embodiments, the processors may be integrated into the fabric such that they are tiled in rows or columns. It is noted that the term "tiled" refers to arranging the processors such that they are interleaved or interspersed among programmable logic elements. For example, the processors may be arranged consecutively in a two dimensional plane with the programmable logic elements such that there are no other programmable logic elements between consecutive processors. This tiling of the processors may allow for efficient fabrication and provisioning of interconnect networks for communicating between the processors, programmable logic elements, and I/O interfaces of the device.

In certain embodiments, the hybrid programmable logic device may include a data bus to move data between the processors, I/O interfaces, and memory on and off chip. In certain embodiments, this data bus may be "hardened," meaning that it consists of dedicated circuit components rather than circuit components that can be reserved for other uses on the device. This hardened data bus allows for high performance data transfer both internal and external to the device. In certain embodiments, this data bus may include horizontal and vertical connectors. Certain groups of the horizontal and vertical connectors may be wired to provide data to and from programmable logic elements, while other groups may be wired to provide data to and from the processors. In certain embodiments, the horizontal and vertical connectors in both groups may be in the same metal layers or layers. These same metal layers may be located above a layer in the interconnect stack in the device that contains the processors and programmable logic elements. In certain embodiments, the horizontal and vertical connectors may be laid out such that their vertical pitch (e.g., vertical position in the interconnect stack) is a multiple of the size of one or more groups of programmable logic elements, processors, or both. Placing the horizontal and vertical connectors for both the processor and programmable logic elements in the same metal layer, and sizing them such that they agree with the size of the programmable logic elements and processors, allows for place and route tools (e.g., software) to address the processors and logic elements as a homogenous routing fabric. In other words, portions of the connectors that route data to and from the processors may be addressed in the same manner as the connectors that route data to and from the programmable logic elements.

In certain embodiments, the hybrid programmable logic device may include an ingress/egress processing block that receives data (e.g., in the form of data packets), and forwards that data to other elements of the device. In certain embodiments, the device may include a network on chip bus which is dedicated to routing and/or carrying the data to and from the ingress/egress processing block to other elements of the device. The ingress/egress processing block may be a hardened ASIC, or may be a block built from the programmable logic elements on the device.

In certain embodiments, the hybrid programmable logic device may include scheduling circuitry that can schedule the transmission of data on the horizontal and vertical connectors in the logic fabric that transmit data between the programmable logic elements and processors. In certain embodiments, this scheduling circuitry may receive interrupt messages addressed to at least one of the processors, meaning that they contain information that indicate that the payload of the data is meant to be processed by a particular processor or processors. In other embodiments, the scheduling circuitry may use other methods of asynchronous communication to send data between the programmable logic elements and the processors. In certain embodiments, the scheduling circuitry may identify which of the processors are meant to process a particular data (e.g., a block or packet of data), and distribute the data to the identified processors. By using interrupt messages or other asynchronous methods of communication, the scheduling circuitry may allow the processors, the programmable logic elements, and the data bus to run at different clock speeds, thus breaking any timing dependency between the network bus and the processor clock speed.

In certain embodiments, the scheduling circuitry may include a program instruction memory that can be reprogrammed during operation of the processors. Each processor may, via the scheduling circuitry, detect a new mode of operation based on information in a received data packet, halt operation in response to the detection of a new mode of operation (e.g., flush out all instructions in any pipeline in the processor) and reprogram the program instruction memory based on data received from other elements in the device.

In certain embodiments, processors and programmable logic may be divided into partitions in order to manage power. For example, partitions of the hybrid programmable logic device may be computed. Each partition may include a subset of the processors and programmable logic elements. At least one measure of processor demand may be computed, and based on this measure the power state of the processors and programmable logic elements in a partition may be altered. This feature may allow the power consumption of the device to be dynamically managed based on the throughput to particular groups of processors and programmable logic elements.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

When designing a many-core device, the type, and number of accelerators that are required for particular applications may be hard to predict. To design a device that addresses more than a single solution, it is common to build in accelerators in the device that are unneeded, and thus waste area on the device and consume excess power. It would therefore be desirable to design a many-core device with programmable logic technology such that the accelerators could be defined at a later stage in the development process (e.g., after deployment of the many-core device).

Further, when designing a many-core device, many agents may request intermittent access to external memory. For example, when the many-core device receives a packet, the payload is split from the header and sent to external memory (or internal buffer) while the header is sent to a processing unit (e.g., a microprocessor or hardware block) for a large amount of processing time (e.g., hundreds of clock cycles). The resulting header, which is possibly modified, is then rejoined with its payload and queued for forwarding off-device. When hundreds of agents are sending and receiving data, coordinating access to memory may be difficult. It would therefore be desirable to design a many-core device with a shared interconnect that allows for flexible routing (e.g., dynamic routing as compared to static routing).

Figure 1A:
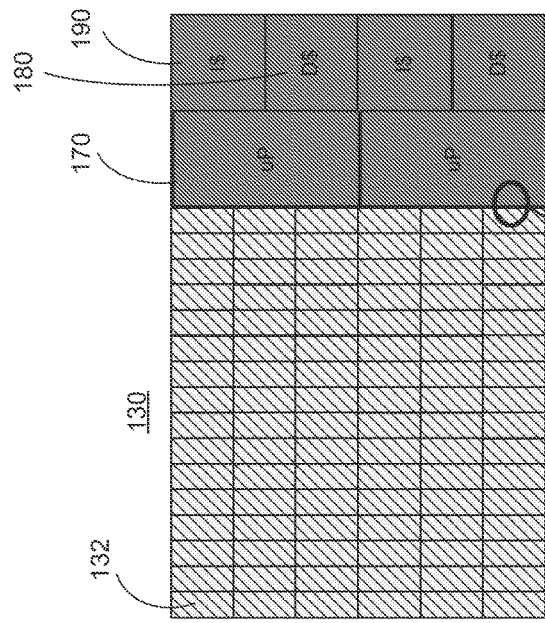
FIG. 1A is a hybrid programmable logic device in accordance with an embodiment of the present invention.

FIG. 1A is a hybrid programmable logic device 100 in accordance with an embodiment of the present invention. Device 100 includes regions of programmable logic elements 130, and processors 150. General purpose input/output circuitry 110 can include one or more generic pins that can be controlled or programmed by external software at runtime. In certain embodiments, general purpose input/output circuitry 110 can be configured to input or output data, can read or write data, can be used as IRQs for wakeup events, or can be used to transfer data from sources peripheral to device 100. High-speed serial interface 120 can facilitate the transfer of information between external sources of data (not shown), programmable logic elements 130, and processors 150 using high-speed transceiver blocks. For example, high-speed serial interface 120 may interface with an Ethernet connection to receive packets of information, process these packets with programmable logic elements 130 and processors 150, and switch the packets to different physical interfaces. Exemplary circuitry for routing received information is discussed below in connection with FIG. 3. In certain embodiments, high-speed serial interface 120 may transfer data at much higher speeds than general purpose input/output circuitry 110. For example, high-speed serial interface 120 may read and write data at a rate of tens of Gigabits per second, while general purpose input/output circuitry 110 may write data at a rate hundreds of Megabits.

In certain embodiments, high-speed serial interface 120 may operate at line-rate, meaning the aggregate throughput rate of device 100 (e.g., 100 Gigabits per second across multiple serial channels), while processors 150 and programmable logic elements 130 operate at a distributed rate, meaning that the aggregate throughput of processing threads (and corresponding memories and hardware acceleration blocks used with those processing threads) is no worse than the minimum throughput for the target application of device 100.

Programmable logic elements 130 can include any combination of logic gates and memory. In certain embodiments, these programmable logic elements may be grouped into logic array blocks ("LABs"), referring to a unit of programmable logic resources in devices provided by Altera Corporation, of San Jose, Calif. However, the invention is applicable to programmable logic elements from any source. In certain embodiments, the programmable logic elements may be grouped into hardware acceleration blocks. Each hardware acceleration block may be designated to perform a certain type of hardware event on received data. In certain embodiments, the hardware acceleration blocks may be configurable such that the event is tailored to that particular situation. For example, the hardware acceleration blocks can accept parameters that further define the hardware event to be performed on a received data packet. Parameters used to configure a hardware acceleration block may, for example, be generated by processors 150. Parameters can be transmitted to the hardware acceleration blocks through a data bus (not shown) that includes horizontal and vertical connectors that are connected to each of the programmable logic elements 130 as well as processors 150. In certain embodiments, programmable logic elements 130 may include any suitable memory clusters, such as M20K memory clusters.

In certain embodiments, the programmable logic elements 130 may be configurable into different hardware acceleration blocks, after device 100 has been fabricated and deployed (e.g., during runtime of device 100 or through a remote update procedure). Thus, the hardware acceleration blocks made up of the programmable logic elements 130 may be late binding, which allows device 100 to be versatile in any number of applications in any number of domains. For example, device 100 may be updated to account for the latest error correction, video and image processing, or data management standards. This is different from commercial Network Processing Units, pipelined processors, and ASIC devices that have both processor and fixed hardware acceleration blocks, as these devices do not allow for the hardware accelerators to be defined after deployment.

As depicted schematically in FIG. 1A, there is more area on device 100 devoted to programmable logic elements 130 than processors 150. This is because programmable logic elements 130 are cheaper than processors 150. In certain embodiments, programmable logic elements 130 may be substantially similar to the programmable logic elements of the Stratix V FPGA sold by Altera Corporation of San Jose, Calif. However, it shall be understood that any programmable logic elements suitable for an FPGA or PLD may be used as programmable logic elements 130.

Processors 150 can include any suitable number of processors with many-core designs. These many-core designs may be based on microprocessor IP by vendors such as ARM, MIPS, and Tensilica. This microprocessor IP allows for the ability to create customized embedded processors (e.g., removing floating-point units), and customized instruction set architectures. In certain embodiments, the processors may be "hardened," meaning that they consist of fixed logic elements rather than programmable logic elements. This feature provides the integration of powerful many-core processors into a programmable logic fabric.

As depicted schematically in FIG. 1A, processors 150 are tiled in a four-column assembly structure in portions of the device 100 where programmable logic elements 130 are not present. In other embodiments, fewer or greater columns of processors may be used. In certain embodiments, the number of columns or processors, and the number of processors in each column may be more or less than depicted in FIG. 1A. The number of columns and number of processors 150 in each column may depend on the processor architecture for each processor. For example, more processors may be tiled on device 100 when the instruction cache and data cache of each processor is reduced. In one example, MIPS 34K multi-threaded processors with 16 KB of instruction cache and data cache are used. In this example, when shrunk to a design target of 28 mm, each processor consumes less than 0.25 square microns of silicon area on the device, which is equivalent to 30 Stratix V LABs. It shall be understood that processors 150 may alternatively laid out in rows on device 100.

In certain embodiments, processors 150 are multi-threaded. Multi-threaded processors provide advantages to applications where it is commonly required to interface with an off-chip memory or lookup which could take multiple clock cycles of processing time, and thus increase latency, or to hide the latency of accelerator processing. For example, by blocking one thread in a processor to this lookup task, the processor is able to proceed with performing other functions. In certain embodiments, the multi-threading may be achieved by time-slicing operation on data received by the processors 150. In other embodiments, the multi-threading may be achieved by well-known operating system mechanisms.

The tiled layout of processors 150 on the device allows for efficient fabrication and provisioning of interconnect networks for communicating between the processors, programmable logic elements, and I/O interfaces of the device. This is because the programmable logic elements 130 and other elements of device 100 such as memory (not shown) are separate from processors 150. In addition, the tiled layout of processors 150 allows for the construction of processors 150 and programmable logic elements 130 in the same metal layers in device 100, as well the construction of an interconnect stack containing a data bus.

Figure 1B:
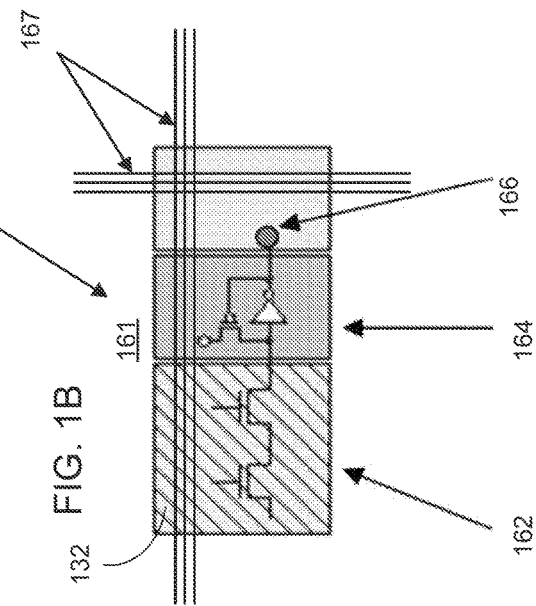
FIG. 1B is an expanded view of the hybrid programmable logic device containing processors adjacent to programmable logic elements in accordance with an embodiment of the present invention.

FIG. 1B is an expanded view of the hybrid programmable logic device 100 containing processors 150 adjacent to programmable logic elements 130 in accordance with an embodiment of the present invention. Two processors are depicted schematically in FIG. 1B as squares containing three components—processor core 170, instruction cache 180, and data cache 190. Also depicted schematically in FIG. 1B are programmable logic elements 130 that are grouped into LABs 132. In certain embodiments, the physical size of a dimension of the processors 150, such as length, height, or width, is a multiple of the same dimension of the programmable logic elements 150, or LABs made up of programmable logic elements 150. For example, as depicted in FIG. 1B, the width of each of the two processors is equal to three LABs 132. This allows for efficient assembly of devices having different dimensions, with differing ratios of processors to programmable logic elements or other logic blocks.

Figure 1C:
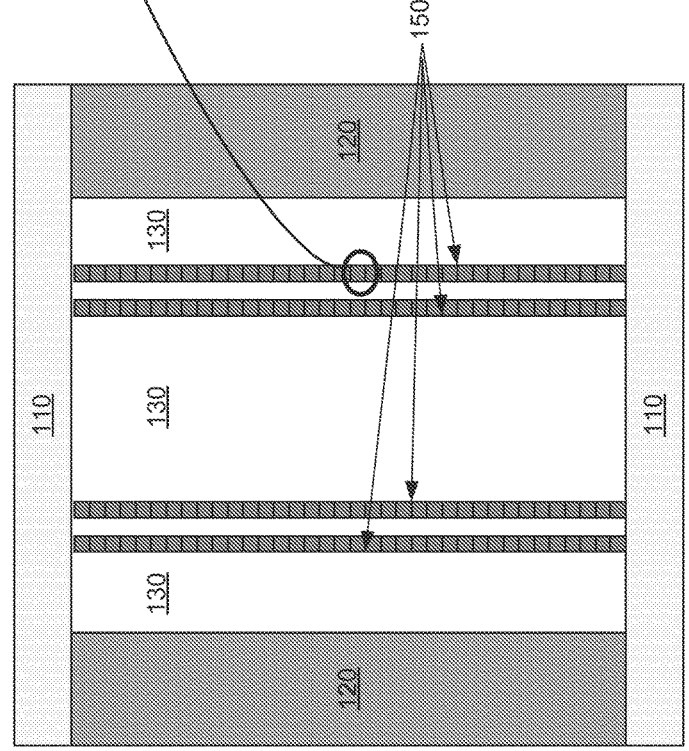
FIG. 1C is an expanded view of the hybrid programmable logic device containing an interface between the processors and programmable logic elements in accordance with an embodiment of the present invention.

FIG. 1C is an expanded view of the hybrid programmable logic device 100 containing an interface 161 between the processors 150 and programmable logic elements 130 in accordance with an embodiment of the present invention.

Interface 161 may be included between every LAB or row of LABs and processors 150. Interface 161 may include LIM/LEIM circuitry 162, interface logic 164, and interface port 166. LIM/LEIM circuitry 162 refers to collections of programmable input muxes "LAB Input Mux" and "Logic Element Input Mux," and may include any suitable number of LIM and LEIM multiplexors as commonly found in devices sold by Altera Corporation of San Jose, Calif. Interface logic 164 may include any suitable circuit components for buffering data to interface port 166. Interface port 166 may include any suitable circuitry for physically delivering signals to one of processors 150.

In certain embodiments, horizontal and vertical connectors 167 may also be included on device 100. As will be discussed below with respect to FIG. 3, horizontal and vertical connectors 167 may transfer data between processors 150, programmable logic elements 120, general input/output interfaces, and memory on and off chip. In certain embodiments, horizontal and vertical connectors may be wired to interface circuitry 161 such that any signal from any of the programmable logic elements 130 can be delivered to interface port 166 via LIM/LEIM circuitry 162 and interface logic 164. For example, multiplexors within the LIM/LEIM circuitry 162 may choose which signal drives any global wire in the horizontal/vertical connectors 167 to connect any of the programmable logic elements 130 with processors 150.

Figure 2A:
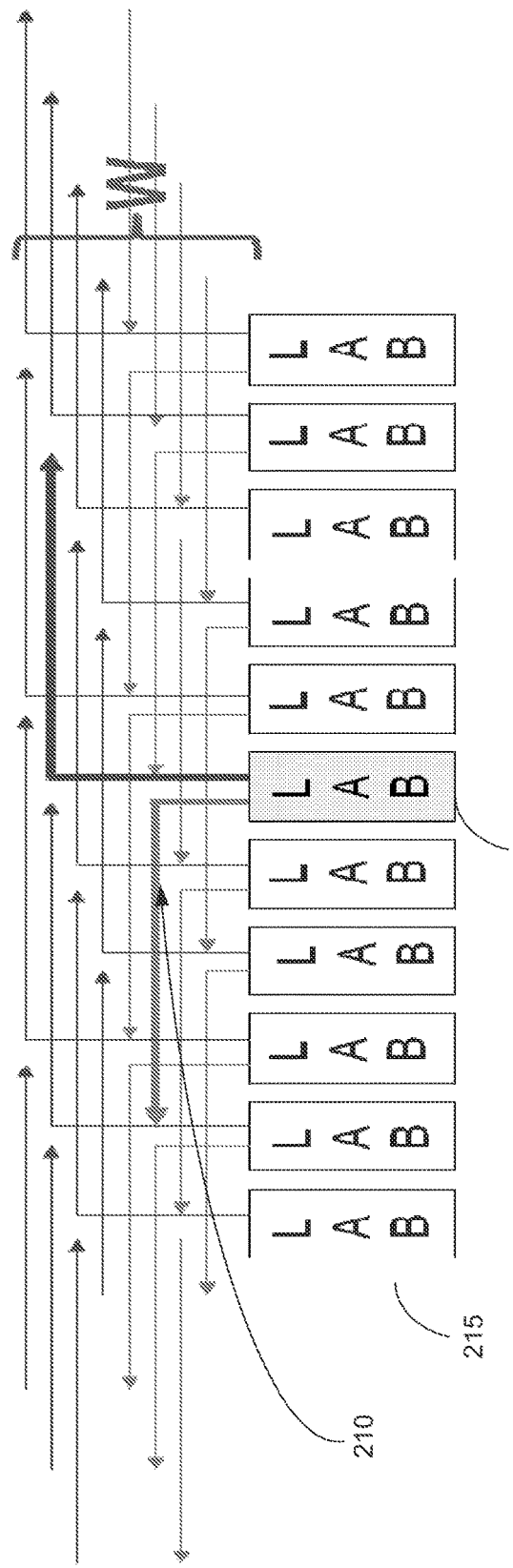
FIG. 2A is an illustrative view of the data bus in the hybrid programmable logic device in accordance with an embodiment of the present invention.

FIG. 2A is an illustrative view of the data bus 210 in the hybrid programmable logic device 100 in accordance with an embodiment of the present invention. Although the wires of data bus 210 are shown above the LABs 215 in the vertical direction, in implementation they are part of an interconnect stack which is above the LABs (e.g., in a metal layer above the metal layers containing the LABs and processors). Similar to horizontal and vertical connectors 167, data bus 210 can transfer data between processors 150, programmable logic elements 130, general input/output interfaces 110, and memory on and off the device 100 (FIG. 1A). FIG. 2A illustratively highlights two wires of data bus 210 routed from LAB 216 of a particular spacing above LABs 215. In certain embodiments, the horizontal and vertical connectors of data bus 210 may be laid out such that their vertical pitch (e.g., vertical position in the interconnect stack, illustrated by 'W' in FIGS. 2A and 2B) is a multiple of the size (e.g., the vertical pitch) of one or more groups of programmable logic elements, processors, or both.

Figure 2B:
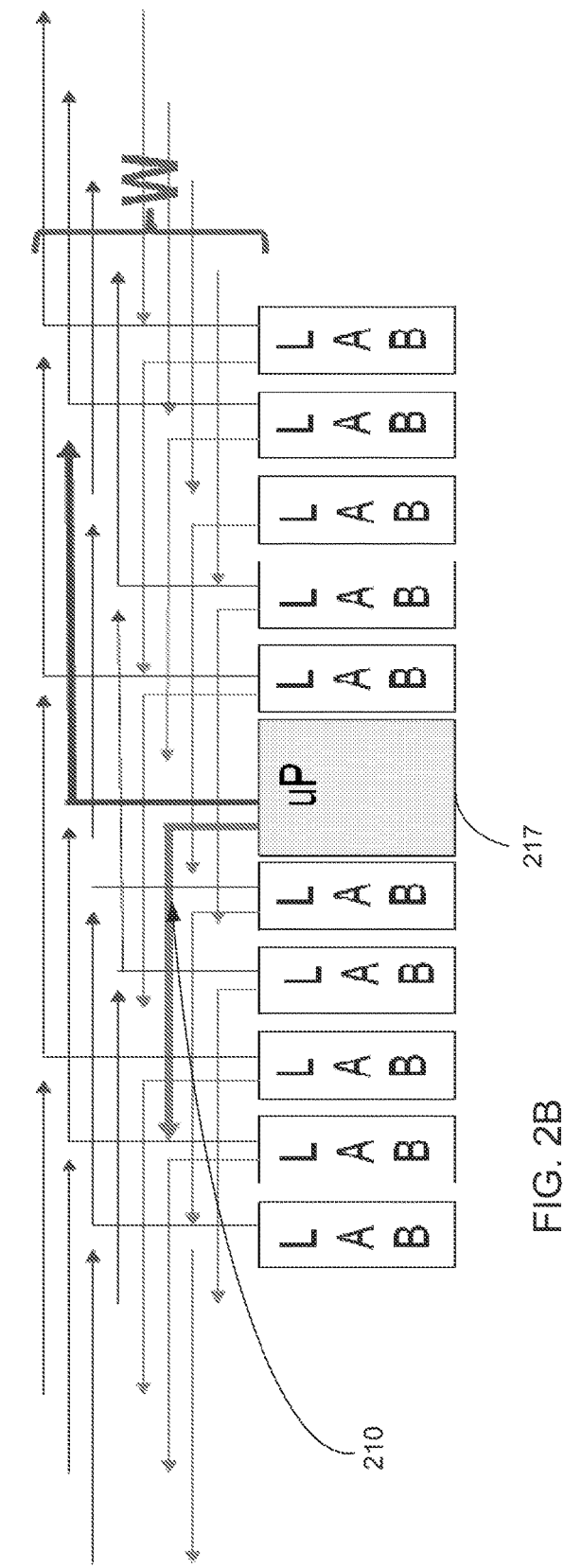
FIG. 2B is another illustrative view of the data bus in the hybrid programmable logic device in accordance with an embodiment of the present invention.

FIG. 2B is another illustrative view of the data bus 210 in the hybrid programmable logic device 100 in accordance with an embodiment of the present invention. As depicted schematically in FIG. 2B, processor 217 is in place of LAB 216. Processor 217 may be part of a column of tiled processors in the device, such as one of tiled processors 150 (FIG. 1A). In certain embodiments, the wiring of data bus 210 has the same vertical pitch and follows the same pattern of the wiring of data bus 210 to LABs 215 and LAB 216. In addition, in certain embodiments, both the wiring from processor 217 and LABs 215 and LAB 216 are in the same metal layer in the interconnect stack (e.g., in a metal layer above the metal layers containing the LABs and processors). By placing the horizontal and vertical connectors for both the processor and programmable logic elements in the same metal layer, and sizing them such that they agree with the size (e.g., vertical pitch) of the programmable logic elements and processors, allows for place and route tools (e.g., software) to address the processors and logic elements as a homogenous routing fabric. In other words, portions of the connectors that route data to and from the processors (such as processor 217) may be addressed in the same manner as the connectors that route data to and from the programmable logic elements (such as the programmable logic elements in LABs 215 and LAB 216).

Figure 3:
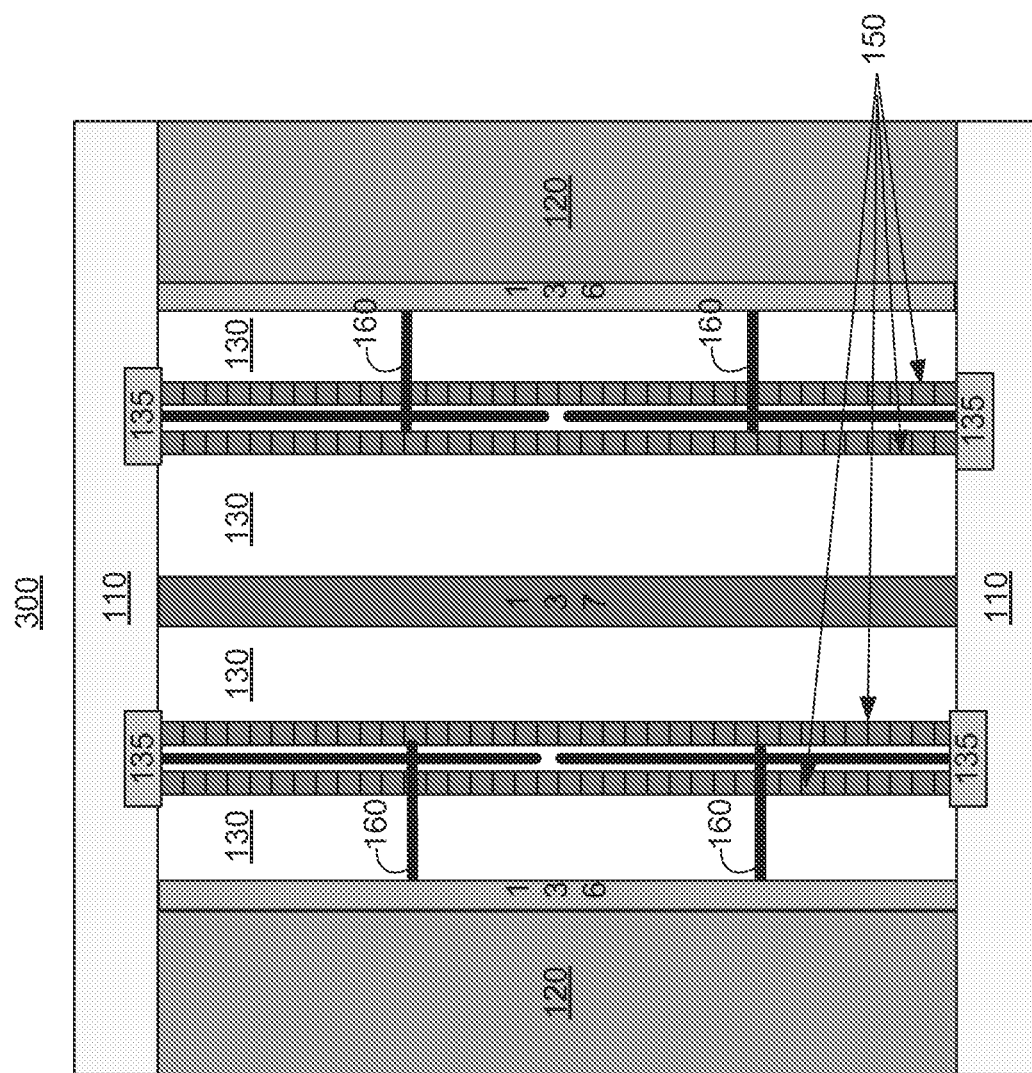
FIG. 3 is a hybrid programmable logic device with a hardened data bus and ingress/egress in accordance with an embodiment of the present invention.
Figure 4B:
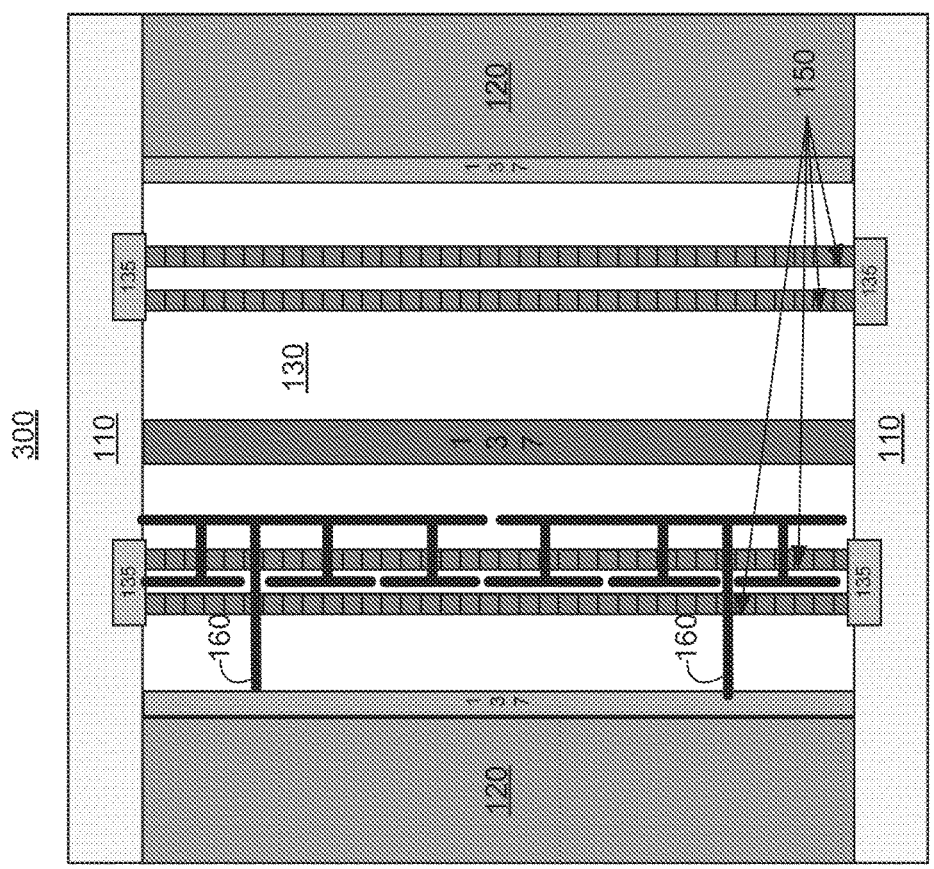
FIG. 4B is a hybrid programmable logic device with a hardened data bus and ingress/egress in accordance with an embodiment of the present invention.
Figure 4A:
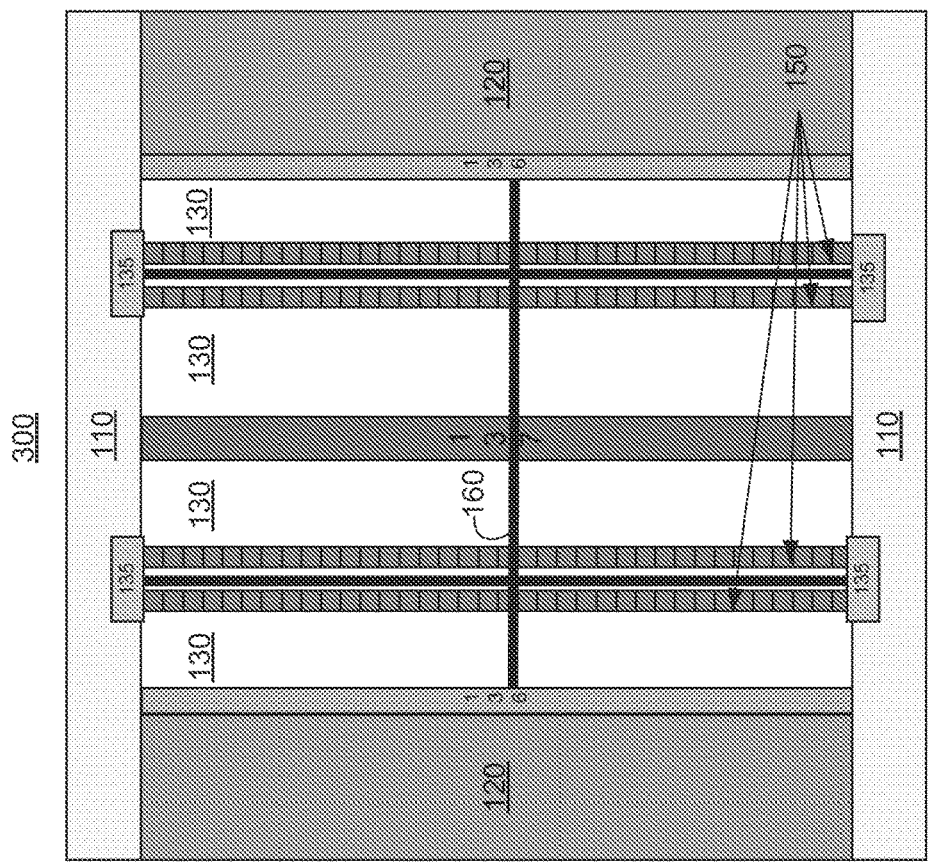
FIG. 4A is a hybrid programmable logic device with a hardened data bus and ingress/egress in accordance with an embodiment of the present invention.

FIG. 3 is a hybrid programmable logic device 300 with a hardened data bus 160 and ingress/egress processing block 136 in accordance with an embodiment of the present invention. FIG. 4A is the same hybrid programmable logic device 300 with a different hardened data bus 160 in accordance with an embodiment of the present invention. FIG. 4B is the same hybrid programmable logic device 300 with another different hardened data bus 160.

Device 300 also includes external memory 135 and embedded ternary-content addressable memory (CAM) memory 137. Hardened data bus 160 may consist of dedicated circuit components that transfer data to and from processors 150, programmable logic elements 130, ingress/egress processing block 136, external memory 135, and embedded ternary-CAM memory 137, rather than being reserved for other uses on the device. In certain embodiments, hardened data bus 160 may be referred to as a network on chip interconnect. In such embodiments, hardened data bus 160 may be dedicated to routing and/or carrying the data to and from the ingress/egress processing block to other elements of the device. Hardened data bus 160 can allow for high performance data transfer both internal and external to the device. In certain embodiments, hardened data bus 160 may include a portion of horizontal and vertical connectors 167 (FIG. 1C) and data bus 210 (FIGS. 2A and 2B). In other embodiments, hardened data bus 160 may be entirely separate from horizontal and vertical connectors 167.

Hardened data bus 160 may have a variety of topologies. For example, hardened data bus 160 may have a ring topology, a shared bus protocol such as AXI designed by ARM holdings of Cambridge, United Kingdom, interconnect technology from Sonics, Arteris or other third party companies, or Avalon interconnect designed by Altera Corporation of San Jose, Calif. In certain embodiments, hardened data bus 160 may be hierarchical. For example, as depicted schematically in FIG. 3, hardened data bus 160 may be a 4-way division. In another example, as depicted schematically in FIG. 4A, hardened data bus 160 may be monolithic. In yet another example, as depicted schematically in FIG. 4B, hardened data bus may be segmented.

In certain embodiments, portions of hardened data bus 160 may be connected or disconnected hierarchically by software that can program device 300. This software may include Quartus software design by Altera Corporation of San Jose, Calif., or any other suitable software. In certain embodiments, the bandwidth of hardened data bus 160 is designed to achieve the line-rate of a particular application. For example, if hardened data bus 160 is 64 bits and operating at 1 GHz with 80% efficiency, it can provide 51 Gbps of bandwidth and be used to target a 50 Gbps streaming video application. In another example, if hardened data bus 160 is 64 bits and operating at 1.5 GHz with 80% efficiency, it can provide 150 Gbps of bandwidth and target a 100 Gb traffic switch application. In certain embodiments, separate hardened data buses may be added to carry data for processor input and output, as LAB input and output.

In certain embodiments, hardened data bus 160 may be placed over (e.g., in a metal layer above) or adjacent to processors 150 and programmable logic elements 130. In this manner, hardened data bus 160 is minimally invasive to the assembly of device 300 (FIG. 3).

External memory 135 may include any suitable interface to external memory, such as DDR memory. External memory 135 can buffer data in applications where device 300 is processing video data or packet data. In certain embodiments, embedded ternary-CAM memory 137 may include any suitable block of content addressable memory, which is useful for networking applications. In certain embodiments, embedded ternary-CAM memory 137 may interface with programmable logic elements 130 and processors 150 using circuitry substantially similar to interface circuitry 161 (FIG. 1C). In certain embodiments, ternary-CAM memory 137 may be replaced by an SRAM or embedded SRAM packet buffer memory.

Ingress/egress processing block 136 can receive data and forward that data to other elements of device 300. For example, ingress/egress processing block 136 can receive data packets and provide protocol termination or packet framing services to device 300. In certain embodiments, ingress/egress processing block 136 may forward received data to hardened data bus 160. In certain embodiments, the ingress/egress processing block may consist of hardened ASIC blocks. These blocks may be structured according to the ASIC blocks disclosed in U.S. Pat. No. 8,314,636, which is incorporated by reference herein in its entirety. In certain embodiments, ingress/egress processing block may be built from programmable logic elements 130.

Figure 5:
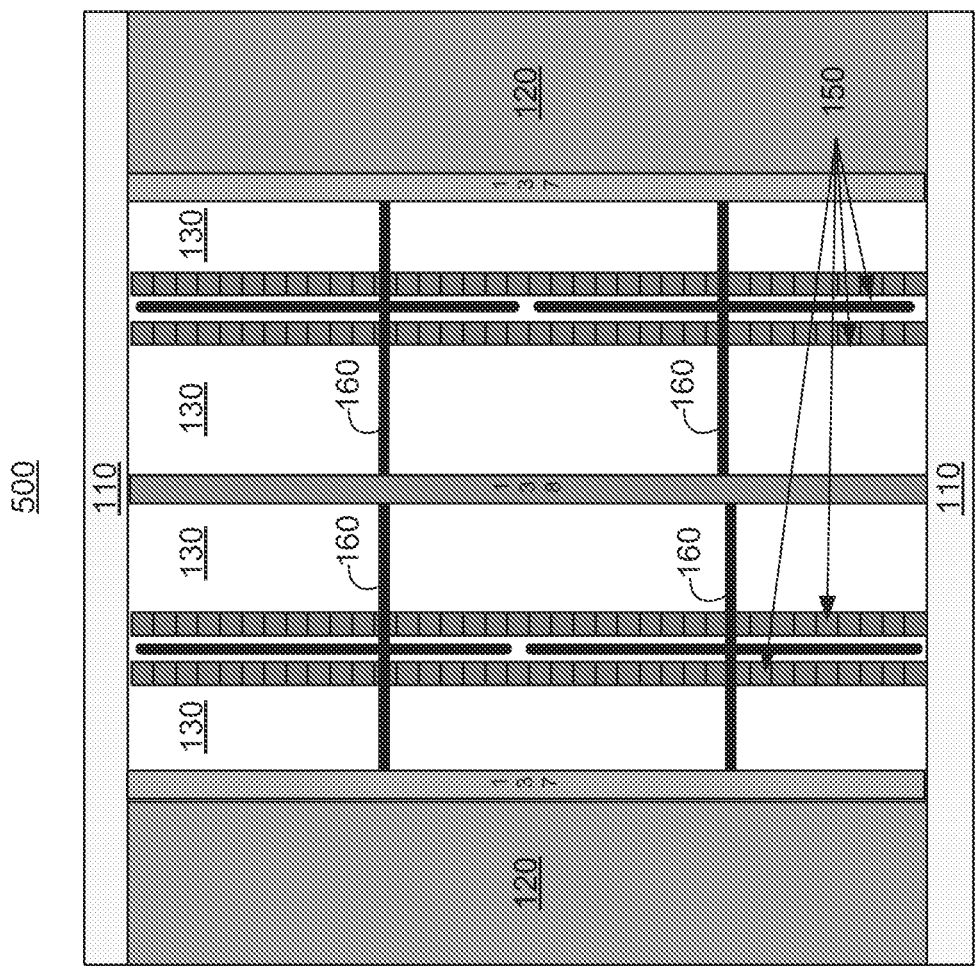
FIG. 5 is a hybrid programmable logic device with a hardened data bus and ingress/egress in accordance with yet another embodiment of the present invention.

FIG. 5 is a hybrid programmable logic device 500 with a hardened data bus 160 and ingress/egress 137 in accordance with yet another embodiment of the present invention. Device 500 may be substantially similar to device 100 (FIG. 1A) and device 300 (FIG. 3), except that a universal interface bus 138 is integrated into device 500 for interfacing to 2.5D or 3D memory, or other functions. As schematically illustrated in FIG. 5, interface 138 can be connected to processors 150 and programmable logic elements 130 via hardened data bus 160. In other embodiments, interface 138 can be connected to processors 150 and programmable logic elements 130 through general-purpose FPGA routing, such as horizontal and vertical connectors 167 (FIG. 1C). In certain embodiments, interface 138 may be manufactured according to the design and methods described in U.S. patent application Ser. Nos. 13/350,662 and 13/620,126, which are incorporated by reference herein in their entirety.

Figure 6:
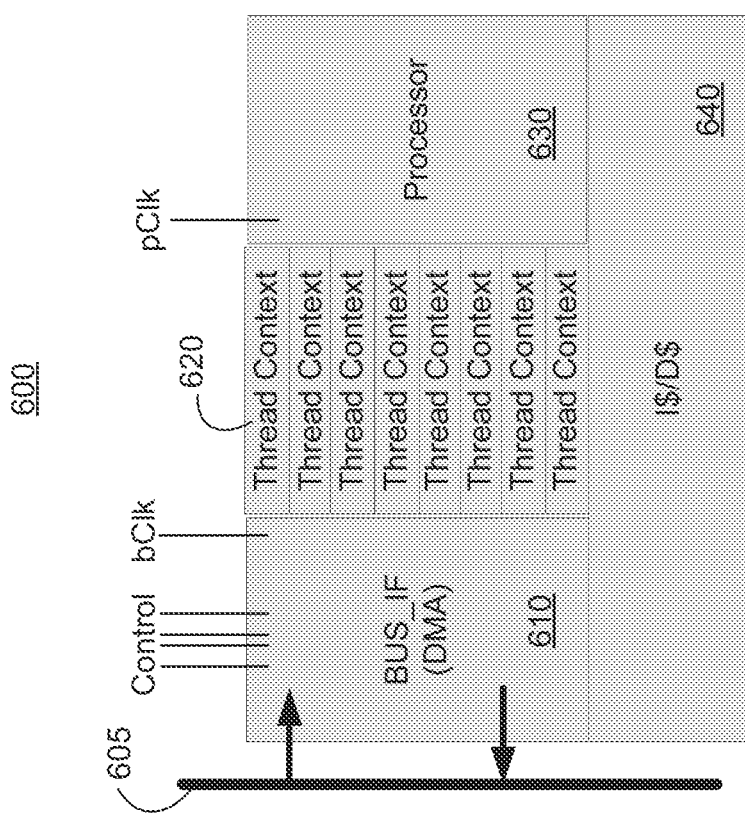
FIG. 6 is scheduling circuitry in accordance with an embodiment of the present invention.

FIG. 6 is scheduling circuitry 600 in accordance with an embodiment of the present invention. Scheduling circuitry 600 includes data bus 605, which can be substantially similar to horizontal and vertical connectors 167 (FIG. 1C), or hardened data bus 160 (FIG. 3). Scheduling circuitry 600 can schedule the transmission of data on the horizontal and vertical connectors, hardened data bus, between programmable logic elements such as programmable logic elements 130 and processor 630. In certain embodiments, processor 630 may be part of a column of tiled processors, such as those described with respect to processors 150 (FIG. 1A). In such embodiments, copies of scheduling circuitry 600 may be integrated with every processor in processors 150.

Scheduling circuitry 600 includes bus interface 610 and threading circuitry 620. In certain embodiments, scheduling circuitry may also include processor 630 and cache 640. Processor 630 may be substantially similar to processors 150 (FIG. 1A), and cache 640 may be substantially similar to instruction cache 180 and data cache 190. In addition, processor 630 may be part of a tiled column or row of processors, such as that discussed with respect to processors 150 (FIG. 1A). In such embodiments, scheduling circuitry 600 may be implemented on the device for every processor in the tiled rows or columns of processors.

Horizontal and vertical connectors 605 may transmit data to and from bus interface 610. Horizontal and vertical connectors 605 may be part of at least a portion of horizontal and vertical connectors 167, hardened data bus 160, or both. In certain embodiments, bus interface 210 may transmit data to and from programmable logic elements on a device and processors on a device using horizontal and vertical connectors 605. For example, bus interface 210 may transmit data between programmable logic elements 130 of device 100 and processor 630 using horizontal and vertical connectors 167. In certain embodiments, the transmission of data between the programmable logic elements and the processors may occur at a rate of speed different, or asynchronous from, the rate of speed of the clock of processor 630. For example, the speed of the operation of the processor may be faster or slower than the speed of operation of the programmable logic elements on the device, and the rate of speed at which data is transmitted between the programmable logic elements and processor using horizontal and vertical connectors 605 may be different than the speed of the clock of processor 630.

In such embodiments, bus interface 610 may provide mechanisms that allow data to be transmitted on the horizontal and vertical connectors 605 at a rate asynchronous with respect to the speed of the clock of processor 630. In certain embodiments, bus interface 610 may receive interrupt messages over horizontal and vertical connectors 605. In such embodiments, these interrupt messages may be addressed to one or more of the processors on the device, meaning that they contain information that indicate that the payload of the data associated with the messages is meant to be processed by a particular processor or processors. Bus interface circuitry 610 may transmit only the data associated with interrupt messages that are addressed to processor 630, and ignore other messages that are not addressed to processor 630. For example, bus interface circuitry 610 may contain a predetermined or hardcoded value, either in software or in hardware associated with bus circuitry 610, that is the address of processor 630. Bus interface circuitry 610 may periodically or constantly monitor the messages transmitted over horizontal and vertical connectors 605 for the address. When the address is detected, bus interface circuitry 610 may buffer data associated with the message addressed to processor 630, and transmit the data from the buffer to processor 630 using threading circuitry 620. Threading circuitry 620 maintains one or more program counters associated with the execution of various tasks in processor 630. In certain embodiments, threading circuitry 620 receives data from bus interface circuitry 610, and determines the appropriate time to send that data to processor 630 based on one or more of the program counters that it maintains. In this manner, scheduling circuitry 600 may allow the processors, programmable logic elements, and the data bus of a device to operate at different clock speeds, thus breaking any timing or clock dependency between the components tied to the network bus and the processor clock speed.

In certain embodiments, any suitable methods of asynchronous communication may be used to send data between the programmable logic elements of the device and processor 630. In certain embodiments, the functionality of scheduling circuitry 600 may be achieved by groups of two or more processors rather than scheduling circuitry 600. These groups of processors may identify which of the processors to send data received from the horizontal and vertical conductors of the device (i.e., transmitted from the programmable logic elements), and distribute the data to the identified processors. This identification may be determined similar to the monitoring procedure described above with respect to bus interface circuitry 610.

In certain embodiments, scheduling circuitry 600 may include a program instruction memory (not shown), which can include any suitable combination of external memory. In certain embodiments, the instruction set of the processors on the device, such as processor 630, may be modified during operation such that they are reprogrammed with a new instruction set. This new instruction set may allow the device to achieve new or different functionality, such as program instructions for a hardware accelerator that may be used by the processors.

In such embodiments, the program instruction memory may detect a new mode of operation for one or more of the processors. For example, the program instruction memory may contain instructions for monitoring data packets on the horizontal and vertical connectors 605. Certain data packets, which can be identified by their packet header, may contain a control packet that contains instructions for reprogramming processor 630 with new or updated functionality. Bus interface circuitry 610 may detect these control packets by monitoring horizontal and vertical connectors periodically or continuously to match the control packet headers. In response to the detection of a new mode of operation, the operation of processor 630 may be halted. For example, once bus interface circuitry 610 detects a control packet header, it may buffer the payload data of that packet and transfer the payload data to threading circuitry 620. Threading circuitry 620 may then perform one or more of the creation, execution, or insertion instructions in the threads or pipeline of processor 630 that cause processor 630 to halt operation, and flush out all pending instructions. Threading circuitry 620 may then transfer the payload of the control packet that contains the instructions for reprogramming processor 630 from a buffer in bus interface circuitry 610 to processor 630. In certain embodiments, information in the header of the control packet may target a group of processors, such as a group of processors in one or more tiled columns on the device. In such embodiments, the process described above may occur substantially in parallel for each of the targeted processors on the device using each processor's associated bus interface circuitry.

In certain embodiments, the processors on the device may be divided into different classes via partitioning. This partitioning may be physical (e.g., hard-coded in the processor), or virtual (e.g., assigned via a record kept by scheduling software) FIG. 7A is an illustration of a partitioned hybrid programmable logic device 100 in accordance with an embodiment of the present invention. Device 100 may be substantially similar to that described with respect to FIG. 1A. Device 100 may be partitioned into a first partition 702, second partition 704, and third partition 706. These partitions may be designated by place and route tools, or any suitable software. In certain embodiments, the partitions may be designated by a table that maps each of the processor's addresses or other unique identifiers with a partition number. In certain embodiments, the partitions of processors may also be associated with a partition of the programmable logic elements of device 100. It shall be understood that while FIG. 7A shows three partitions, the processors on device 100 may be divided into any suitable number of partitions in any suitable geometry on the device.

Each partition 710, 720, and 730 may be associated with a different class of processor and programmable logic elements. In certain embodiments, these classes may be used to implement alternative processing models via different types of processing. In such embodiments, each partition may be associated with a different processing or hardware acceleration function. For example, the processors associated with first partition 702 may be designated to handle flow identification processing, the processors associated with second partition 704 may be designated to handle initial packet processing and distribution, and the processors associated with third partition 706 may be designated to handle system or device-wide state processing. In this manner, device 100 may be configured to handle any number of applications. The use of device 100 in packet processing applications is further illustrated and discussed in U.S. patent application Ser. No. 13/804,419, titled "Mapping Network Applications To A Hybrid Programmable Many-Core Device", filed concurrently herewith, which is incorporated by reference herein in its entirety.

In certain embodiments, the different classes of processors and programmable logic elements may be used to manage power usage of device 100. For example, processors and programmable logic elements associated with partitions of device 100 may be powered up and down dynamically based on the demand for the processing capabilities of the processors and logic elements associated with each partition. This process is described with respect to FIG. 7B below.

In certain embodiments, processors and programmable logic elements associated with one or more partitions of device 100 may be designated as housekeeper processors. These housekeeper processors may implement functions such as power and clock management on behalf of device 100. In certain embodiments, these housekeeper processors may be designated by the user of place and route tools. In other embodiments, these housekeeper processors may be designated by device 100 automatically during runtime of device 100.

Figure 7B:
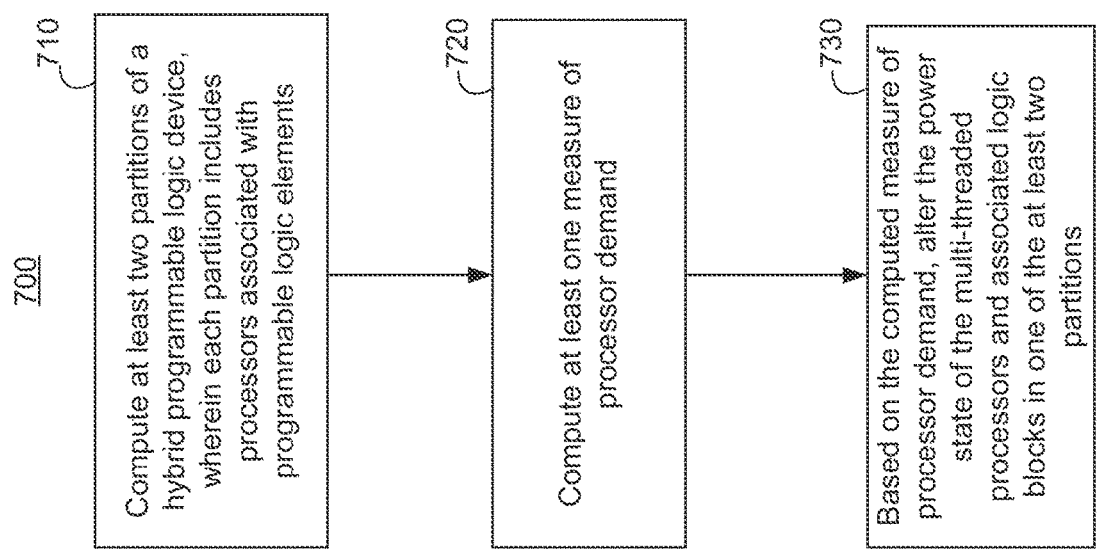
FIG. 7B is an illustrative process for reducing power consumption of a hybrid programmable logic device in accordance with an embodiment of the present invention.
Figure 7A:
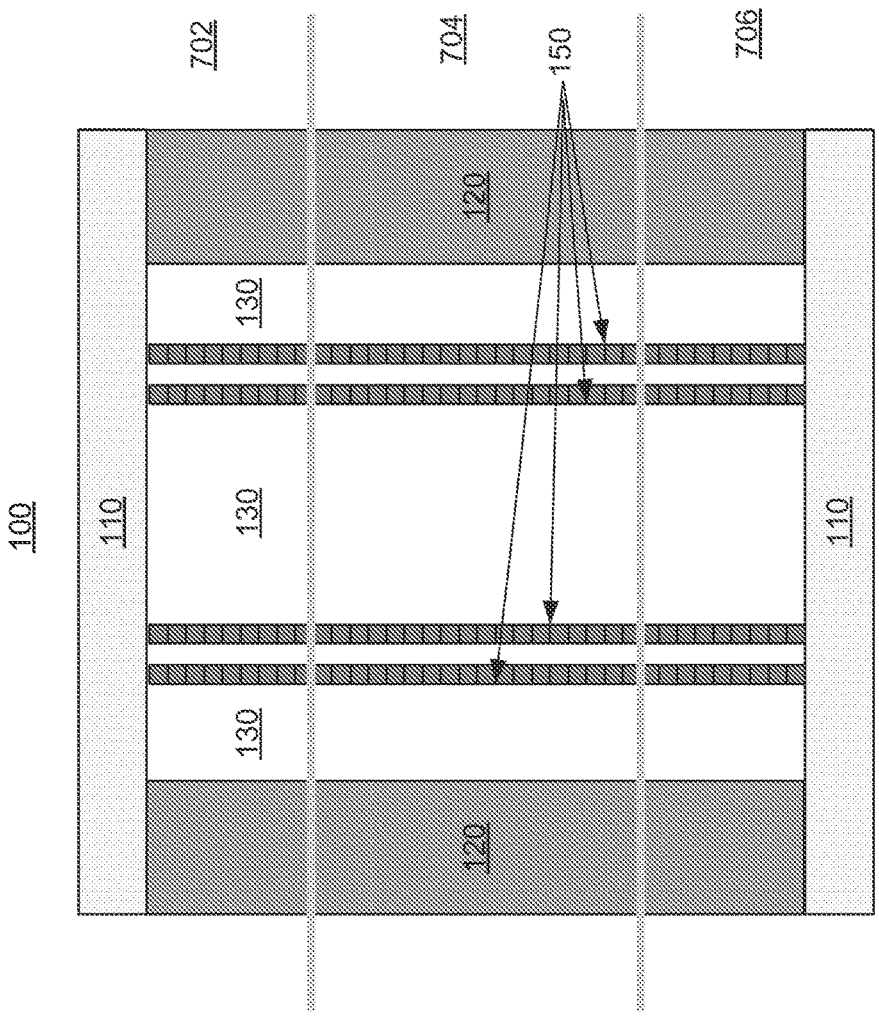
FIG. 7A is an illustration of a partitioned hybrid programmable logic device in accordance with an embodiment of the present invention.

FIG. 7B is an illustrative process 700 for reducing power consumption of a hybrid programmable logic device, such as device 100 (FIGS. 1A and 7A), in accordance with an embodiment of the present invention. Process 700 begins at step 710. At step 710, at least two partitions of the device are computed, each partition including processors associated with programmable logic elements. Each of these two partitions may be substantially similar to partitions 702, 704, and 706 discussed with respect to FIG. 7A. In certain embodiments, the partitions may be computed by place and route software before operation of the device. In other embodiments, the partitions may be computed by scheduling software during the operation of the device. This scheduling software may be executed on a host processor external to the device, or on designated housekeeper processors. In such embodiments, the scheduling software may change the partitions dynamically during the operation of the device. For example, at a first time, the scheduling software may designate a first partition associated with 40% of the processors and associated programmable logic elements that are actively being used for hardware acceleration functions, and a second partition associated with 60% of the processors and associated programmable logic elements that are not actively being used. Then, at a subsequent time, after more of the processors and programmable logic elements have become active, the scheduling software may designate a first partition associated with 55% of the processors and programmable logic elements that are actively being used for hardware acceleration, and a second partition associated with 45% of the processors and associated programmable logic elements that are not actively being used. In this manner, the device can actively adjust its power usage based on throughput of the device. In certain embodiments, the partitions may be associated with a "top half" and "bottom half" of the processors and associated programmable logic elements. In such embodiments, scheduling software may designate the partition associated with the "bottom half" of the resources in the device in a power savings mode while the partition associated with the "top half" of the resources in the device may be designated for an active mode. In certain embodiments, the partitions may be computed by determining what hardware acceleration functions are being executed by a processor or group of processors, and then designating those processors and the programmable logic elements associated with executing a particular hardware acceleration function as a single partition.

Process 700 may proceed to step 720. At step 720, at least one measure of processor demand is computed. In certain embodiments, these measures of processor demand may be computed for each partition computed at step 710. In certain embodiments, a measure of processor demand may be computed by the scheduling software. In certain embodiments, the measure of processor demand may be computed by determining the number of received data packets that are waiting (e.g., in a queue) to be processed by a processor or a group of processors (e.g., all of the processors in a particular partition). In one embodiment, if a processor or group of processors have not received data packets for a predetermined period of time (e.g., because the processors and associated programmable logic elements perform a hardware acceleration function that is not being used), the processor or group of processors may be designated as unneeded, and marked for powering down as will be discussed with respect to step 730 below. In this manner, processors which are no longer needed for their processing power are figuratively "laid off" from performing their job on device 100. In the same embodiment, if data packets are subsequently received for the processor or group of processors marked as idle, those data packets may be queued and the processor or processors may be designated as active and marked for powering on as will be discussed with respect to step 730 below. In this manner, idle processors which are needed again are figuratively hired back to performing their job on device 100. In another embodiment, if a processor or group of processors have received a number of data packets below a predetermined threshold, the processor or group of processors may be designated as unneeded, and marked for powering down as will be discussed with respect to step 730 below.

Process 700 may then proceed to step 730. At step 730, the power state of the processors and associated programmable logic blocks in the partitions may be altered based on the measure of processor demand computed at step 720. In certain embodiments, the power state of a partition may be altered by powering down the resources of the device allocated to that partition. For example, if processor demand is calculated for a particular partition as being less than a threshold number of received data packets, then the processors or groups of processors and associated programmable logic elements of that partition may be powered down. In certain embodiments, resources within a partition may be powered down by disabling the clock signal provided to those resources. In certain embodiments, the power state of a partition may be altered by powering up the resources of a partition that was previously powered down or is dormant. For example, if the device determines that the resources in a particular partition that is powered down are needed to execute a new or scheduled hardware acceleration function, or that data packets are currently being received that call for resources associated with a hardware acceleration function that were previously powered down, then the resources within that partition may be powered up. In certain embodiments, resources within a partition may be powered up by enabling the clock signal provided to those resources.

It will be understood that the foregoing is only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A hybrid data processing device, comprising:
   an array of hardened processors;
   an array of programmable logic elements;
   a plurality of regions respectively comprising:
      a hardened processor of the array of hardened processors configurable to operate at a first clock rate, wherein the hardened processor of the array of hardened processors is communicatively coupled to the array of programmable logic elements operating at a second clock rate different from the first clock rate, wherein the array of programmable logic elements is reconfigurable at runtime of the hybrid data processing device; and
      a plurality of connectors configurable to transfer data between the hardened processor of the array of hardened processors and the array of programmable logic elements;
   a hardened data bus that enables static routing between the hardened processor of the array of hardened processors and the array of programmable logic elements, wherein the hardened data bus comprises a plurality of horizontal connectors and a plurality of vertical connectors coupling the array of hardened processors to the array of programmable logic elements; and
   an interface configurable to perform at least one synchronization function to convert the data from the first clock rate to the second clock rate.

2. The hybrid data processing device of claim 1, wherein the hardened processor of the array of hardened processors comprises an instruction memory and a data memory.

3. The hybrid data processing device of claim 1, wherein the hardened processor of the array of hardened processors is configurable to perform floating-point precision operations.

4. The hybrid data processing device of claim 1, wherein the hardened processor of the array of hardened processors is configurable as a hardware accelerator to accelerate a hardware function.

5. The hybrid data processing device of claim 1, wherein the plurality of connectors comprises horizontal and vertical connectors.

6. The hybrid data processing device of claim 1, wherein the plurality of connectors is configurable to form a network-on-chip.

7. The hybrid data processing device of claim 1, wherein the hardened processor of the array of hardened processors comprises a processor core.

8. The hybrid data processing device of claim 1, wherein the plurality of connectors is compatible with an Advanced eXtensible Interface (AXI) bus protocol.

9. The hybrid data processing device of claim 1, wherein the hardened processor of the array of hardened processors is configurable for parallel processing.

10. A data processing system comprising a programmable circuit, wherein the data processing system comprises:
   an array of hard processors;
   an array of programmable logic elements;
   a plurality of regions comprising:
      a first region disposed vertically adjacent to a second region;
      the second region disposed vertically adjacent to the first region and a third region;
      the third region disposed vertically adjacent to the second region, wherein at least one region of the plurality of regions comprises:
         a hard processor of the array of hard processors communicatively coupled to the array of programmable logic elements, wherein the hard processor of the array of hard processors is configurable to operate at a first clock rate and receive data from the array of programmable logic elements, wherein the array of programmable logic elements is configurable to operate at a second clock rate different from the first clock rate, and wherein the array of programmable logic elements is reconfigurable at runtime of the data processing system; and
         a plurality of interconnections configurable to transfer data between the hard processor of the array of hard processors and array of programmable logic elements;
      a hard data bus that enables static routing between the hard processor of the array of hard processors and the array of programmable logic elements, wherein the hard data bus comprises a plurality of horizontal connectors and a plurality of vertical connectors coupling the array of hard processors to the array of programmable logic elements; and
      an interface configurable to perform at least one synchronization function to convert the data from the first clock rate to the second clock rate.

11. The data processing system of claim 10, wherein the hard processor of the array of hard processors of the at least one region is configurable to execute instructions stored by a program memory associated with the at least one region.

12. The data processing system of claim 10, wherein the plurality of interconnections comprises horizontal and vertical interconnections.

13. The data processing system of claim 10, wherein the hard processor of the array of hard processors is configurable as a hardware accelerator to accelerate a hardware function.

14. The data processing system of claim 10, wherein the data processing system is configurable to perform network and packet processing.

15. The data processing system of claim 10, wherein the plurality of interconnections is configurable to form a network-on-chip.

16. A programmable logic device comprising:
   an array of processors;
   an array of programmable logic elements;
   a plurality of regions comprising:
      a first region comprising:
         a first processor of the array of processors communicatively coupled to the array of programmable logic elements, wherein the array of programmable logic elements is reconfigurable at runtime of the programmable logic device; and
         a first plurality of interconnections configurable to transfer first data between respective regions of the plurality of regions;
      a second region comprising:
         a second processor of the array of processors communicatively coupled to the array of programmable logic elements; and
         a second plurality of interconnections configurable to transfer second data between the respective regions of the plurality of regions; and
   a hard data bus that enables static routing between:
      the first processor of the array of processors and the array of programmable logic elements;
      the second processor of the array of processors and the array of programmable logic elements; or
      both, wherein the hard data bus comprises a plurality of horizontal connectors and a plurality of vertical connectors coupling the array of processors to the array of programmable logic elements; and
   an interface configurable to perform at least one synchronization function to convert the first data or the second data from a first clock rate to a second clock rate different from the first clock rate, wherein the first clock rate is associated with the first processor or the second processor of the array of processors, and wherein the second clock rate is associated with the array of programmable logic elements.

17. The programmable logic device of claim 16, wherein the first processor, the second processor, or both, comprises a processor core.

18. The programmable logic device of claim 16, wherein the first processor, the second processor, or both, is configurable to execute instructions stored by a program memory.

19. The programmable logic device of claim 16, wherein the first processor, the second processor, or both, is configurable to perform floating-point precision operations.

20. The programmable logic device of claim 16, wherein the programmable logic device is configurable to perform network and packet processing.

* * * * *